US009923917B2

(12) United States Patent
Fausto et al.

(10) Patent No.: US 9,923,917 B2
(45) Date of Patent: Mar. 20, 2018

(54) SYSTEM AND METHOD FOR AUTOMATIC CALCULATION OF CYBER-RISK IN BUSINESS-CRITICAL APPLICATIONS

(71) Applicant: Onapsis, Inc., Boston, MA (US)

(72) Inventors: Emiliano José Fausto, Ciudad de Buenos Aires (AR); Ezequiel David Gutesman, Ciudad de Buenos Aires (AR); Javier Burroni, Ciudad de Buenos Aires (AR); Pablo Müller, Buenos Aires (AR)

(73) Assignee: Onapsis, Inc., Boston, MA (US)

( * ) Notice: Subject to any disclaimer, the term of this patent is extended or adjusted under 35 U.S.C. 154(b) by 178 days.

(21) Appl. No.: 14/924,240

(22) Filed: Oct. 27, 2015

(65) Prior Publication Data
US 2016/0119373 A1   Apr. 28, 2016

Related U.S. Application Data

(60) Provisional application No. 62/068,976, filed on Oct. 27, 2014.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 2463/102* (2013.01)

(58) Field of Classification Search
None
See application file for complete search history.

(56) References Cited

U.S. PATENT DOCUMENTS

| 8,955,115 B2 | 2/2015 | Sabetta et al. |
| 2003/0154393 A1* | 8/2003 | Young ............ G06F 21/577 726/25 |
| 2006/0253709 A1* | 11/2006 | Cheng ............ G06F 21/577 713/182 |

(Continued)

OTHER PUBLICATIONS

SAP SE; SAP Solution Brief; Protect Your Connected Business Systems by Identifying and Analyzing Threats; 2014.

(Continued)

*Primary Examiner* — Malcolm Cribbs
(74) *Attorney, Agent, or Firm* — Peter A. Nieves; Sheehan Phinney Bass & Green PA

(57) ABSTRACT

A system for calculating cyber-risk in a software application includes a cyber-risk calculator. The cyber-risk calculator receives a security assessment result sample having a list of security modules, each security module listing including a respective result of a security assessment of the application identifying a vulnerability and/or misconfiguration capable of being exploited and/or abused. When run in a risk calculation mode, the cyber-risk calculator determines a world partition of the application in the security assessment result sample belongs to, references a set of parameters from a parametrization database according to the world partition corresponding to the application, determines a cyber-risk exposure level for the application based upon the security assessment result sample and the set of parameters, and reports results of the cyber-risk calculation.

21 Claims, 4 Drawing Sheets

(56) References Cited

U.S. PATENT DOCUMENTS

| | | | | |
|---|---|---|---|---|
| 2007/0067847 A1* | 3/2007 | Wiemer | G06F 21/577 | 726/25 |
| 2008/0168529 A1* | 7/2008 | Anderson | G06F 21/577 | 726/1 |
| 2009/0024663 A1* | 1/2009 | McGovern | G06F 21/577 | |
| 2009/0077666 A1* | 3/2009 | Chen | G06F 21/577 | 726/25 |
| 2014/0142988 A1* | 5/2014 | Grosso | G06Q 40/08 | 705/4 |
| 2014/0181982 A1* | 6/2014 | Guo | G06F 21/60 | 726/25 |
| 2014/0189868 A1* | 7/2014 | Laniepce | G06F 21/552 | 726/23 |
| 2014/0201836 A1* | 7/2014 | Amsler | H04L 63/20 | 726/23 |
| 2014/0279641 A1* | 9/2014 | Singh | G06Q 10/06 | 705/325 |
| 2015/0067143 A1* | 3/2015 | Babakhan | G06F 11/301 | 709/224 |
| 2015/0319187 A1* | 11/2015 | Huang | H04L 63/1433 | 726/25 |
| 2017/0279843 A1* | 9/2017 | Schultz | H04L 63/1433 | |

OTHER PUBLICATIONS

SAP SE; SAP Enterprise Threat Detection presentation; Oct. 15, 2014.

Martin Plummer; Safeguard Your Business—Critical Data with Real-Time Detection and Analysis; SAPInsider Oct.-Dec. 2014 issue.

International Search Report for PCT/US2015/057605, dated Jan. 21, 2016.

\* cited by examiner

SYSTEM AND METHOD FOR AUTOMATIC CALCULATION OF CYBER-RISK IN BUSINESS-CRITICAL APPLICATIONS

CROSS-REFERENCE TO RELATED APPLICATIONS

This application claims the benefit of U.S. Provisional Patent Application Ser. No. 62/068,976, filed Oct. 27, 2014, entitled "Framework for Automatic Calculation of Cyber Risk in business-critical applications," which is incorporated by reference herein in its entirety.

TECHNICAL FIELD

The present invention is generally related to computer system cyber-risk and, in particular, to automatically calculating cyber-risk in business-critical applications.

BACKGROUND OF THE INVENTION

With the proliferation of interconnected information systems and computers, security has become a major issue for companies. Cyber-attacks focused on gaining complete control over the systems, stealing sensitive business or personal information contained in them or disrupting operations though the exploitation of software vulnerabilities and misconfigurations are frequently hitting the headlines. As used herein, "cyber-risk" refers to a degree of vulnerability of a computer based system to unauthorized access to that system based on the vulnerabilities present in the system, and the probability of an attacker to exploit these vulnerabilities and misconfigurations. Cyber-risk may be used to indicate the degree to which companies may be exposed to cyber-attacks.

Measurement of cyber-risk on information systems and investment in cyber-insurance policies are topics of interest among government agencies and in the private sector. Despite the attention it has received there is still little public information about incidents involving cyber-risk.

Also, information technology (IT) security investment and cybercrime costs have been subjects of wide interest among researchers. Investment in cyber-risk is a key element of business practices in most industries and government agencies.

A central problem for organizations is the huge amount of security patches inside their ecosystems. From operating system (OS) level patches to application-specific patches, the practice of prioritizing and applying the fixes for security issues has been long debated. It has been recently suggested that prioritizing patches according to the Common Vulnerability Scoring System (CVSS—an industry standard scoring system for software vulnerabilities) of the vulnerabilities is an inefficient practice that is sometimes misleading in terms of the level of protection this prioritization gives to the organizations.

In the business arena, organizations have relied on business-critical applications to manage their most valuable assets and processes since the 1970s. The first 30 years of this kind of software were focused on building customizable products where organizations mapped their critical business processes. The biggest competitors for this type of platforms are SAP and Oracle.

During the first 30 years of existence of business-critical applications, the main security concern for administrators was directed to the correct assignment of permissions and roles, an activity that received the name of Segregation of Duties (SoD). A major reason for focusing on SoD activities was to prevent fraudulent activities inside the company (e.g., between employees) and to comply with the wide variety of regulations in different industries imposed by external regulation entities such as SOX, HIPAA and NERC among others.

In 2007 the first presentation demonstrating technical attacks on the internals of Business-Critical applications appeared. This opened the door for a new approach to security and exposed major threats for these giants managing the "crown jewels" of the biggest businesses of the world.

Despite an increasing interest in mitigating cyber-attacks, measuring risk and having a patching strategy sound with that risk measure is still largely an unsolved problem. Even for those organizations with clear cyber-insurance policies, modeling cyber-risk is a very difficult task.

Cyber-risk measurement is not merely an IT Security issue, having gravitated into the very core of businesses, and requiring novel and realistic approaches for real-life scenarios.

A vast variety of platforms, operating systems, applications, and configurations may be present in a given organization. Mixing this with the heterogeneous security practices followed by vendors and the diversity of patching policies makes it very difficult to properly develop a cyber-risk model that can help in the task of correctly measuring and mitigating risk.

In the article entitled "Modeling cyber-insurance: Towards a unifying framework. In 9th Annual Workshop on the Economics of Information Security," (WEIS 2010, Harvard University, Cambridge, Mass., USA, Jun. 7-8, 2010), Rainer Bohme and Galina Schwartz pointed out that "the market for cyber-insurance failed to thrive and remained in a niche for unusual demands: coverage is tightly limited, and clients include SMBs [Small and Medium Businesses] in need for insurance to qualify for tenders, or community banks too small to hedge the risks of their online banking operations." Companies may be absorbing excess risk because the market of cyber-risk has not yet exploded. This produces an economical and financial impact which makes the problem of measuring cyber-risk a concern across the whole organization, rather than an exclusive concern of IT security teams.

This demonstrates two major needs: First, financial and non-IT teams need an understandable language to correctly manage cyber-risk. Second, IT Security teams still need a methodology that allows the prioritization of fixes transforming the measured cyber-risk into actionable milestones.

In view of the shortcomings discussed above, there is a need for systems and methods for automated cyber-risk calculation in business-critical applications that take a fresh approach and overcomes the drawbacks of the conventional techniques.

SUMMARY OF THE INVENTION

Embodiments of the present invention provide APPLICATIONS a system and method for automatic calculation of cyber-risk in business-critical applications. Briefly described, the present invention is directed to a system for calculating cyber-risk in a software application. A cyber-risk calculator receives a security assessment result sample having a list of security modules, each security module listing including a respective result of a security assessment of the application identifying a vulnerability and/or misconfiguration capable of being exploited and/or abused. When run in a risk calculation mode, the cyber-risk calculator determines a world partition of the application in the security assessment result sample belongs to, references a set of parameters from a parametrization database according to the world partition corresponding to the application, determines a cyber-risk exposure level for the application based upon the security assessment result sample and the set of parameters, and reports results of the cyber-risk calculation.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION OF THE INVENTION

Figure 1:
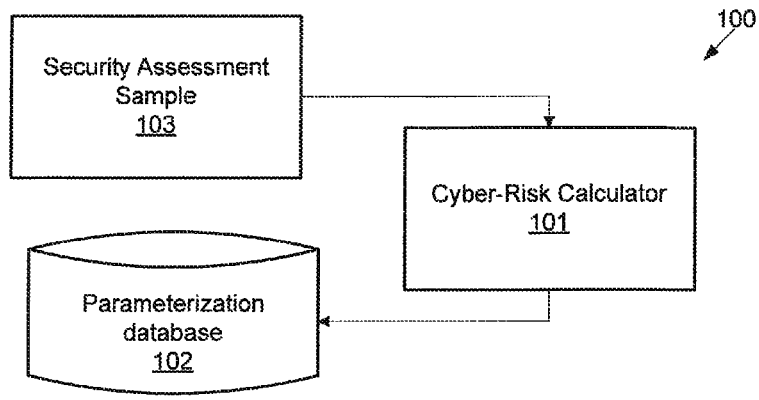
FIG. 1 is a schematic diagram depicting the general process of taking one or more security assessment samples 103 to be processed by the cyber-risk calculator 101 in order to populate the parametrization database 102.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention demonstrate systems and methods for cyber-risk calculation for a smaller domain than any combination of software systems (such as web servers, general-purpose client applications, et cetera), for example, business-critical applications. The system may be applicable to SAP and Oracle-based environments. Examples of these types of applications include solutions for Enterprise Resource Planning (ERP), Customer Relationship Management (CRM), Supplier Relationship Management (SRM), Supply Chain Management (SCM), Product Life-cycle Management (PLM), Human Capital Management (HCM), Business Intelligence (BI), and Integration Platforms, among others. Industry-recognized software products in this area may typically involve SAP NetWeaver-based solutions and the SAP™ R/3 platform, SAP HANA, SAP Business Objects, Oracle E-Business Suite, JD Edwards Enterprise One, PeopleSoft, Siebel and Microsoft Dynamics. These products are used in most of the Fortune-100 and large governmental organizations worldwide. SAP™ alone has more than 90,000 customers in more than 120 countries.

The notion of risk as applied to the present invention is based on the concept of an actuarial fair premium $\pi$:

$$\pi = p(c)E(L)$$

where $\pi$ is the premium, $p(c)$ is the probability of a system of being compromised in a given time window, and $E(L)$ is the expected loss when the system has been compromised. The aim of using a premium measured as the expected loss is to allow a simple integration of the information security risk into the company's risk management process.

The embodiments calculate cyber-risk for a set of logically interconnected assets running business-critical applications based on the vulnerabilities these assets present, the types of interconnections they share and the intrinsic properties of each vulnerability, referred to here as "security module features."

FIG. 1 is a block diagram depicting the general process of taking a security assessment sample 103 to be processed by the cyber-risk calculator 101 in order to populate the parametrization database 102. As shown in FIG. 1, a first embodiment of a system 100 includes one or more cyber-risk calculators 101 deployed in a business-critical application environment including, for example, a variety of business-critical applications from different vendors such as SAP and Oracle. Each cyber-risk calculator 101 calculates the cyber-risk exposure for each of the business-critical applications being monitored for risk, as described further below. The first embodiment receives a security assessment sample 103 as input. The security assessment sample 103 is a list of security modules in a penetration testing tool or security suite (not part of the present invention) with their respective results while run against a target business-critical application during a security assessment. Each security module can probe a target system looking for the presence of a software vulnerability or misconfiguration related to its security and reports the result as "successful" or "not successful." The security assessment sample 103 is obtained by security assessments performed against the monitored business-critical. These can be used to set up the risk calculation parameters or to actually calculate the risk to which a given asset is exposed, depending on the working mode of the cyber-risk calculator 101 which can operate either in "parametrization mode" or in "risk calculation mode".

The "parametrization mode" takes the input and calculates parameters, for example, the probability of success of each security module, stored in the parametrization database 102.

The "risk calculation mode" takes the input and reports the cyber-risk levels for the assets running business-critical applications whose security assessment is supplied as input.

The parameters stored in the parametrization database are initially set to a set of default values taken from a given set of security assessment result samples.

The cyber-risk calculator 101 may also receive information from a security monitoring suite, not part of the system 100. This information may include alarms triggered each time the security monitoring suite detects a vulnerability/misconfiguration being actively exploited/abused against the monitored systems. These alarms include the identification of the vulnerability/misconfiguration being exploited/ abused, which is also addressed by one security module present in the security assessment sample 103, the source of the attack (IP address) and data specific to each module, which depends on the nature of the vulnerability being exploited (e.g., for a default username being used by an attacker to log into an SAP system, the security monitor would raise an alarm indicating the username being abused, the timestamp of the log in, the assets being targeted and the source IP of the detected attack).

The mechanisms to calculate cyber risk are based on a statistical model described in section Underlying Statistical Model.

Figure 2:
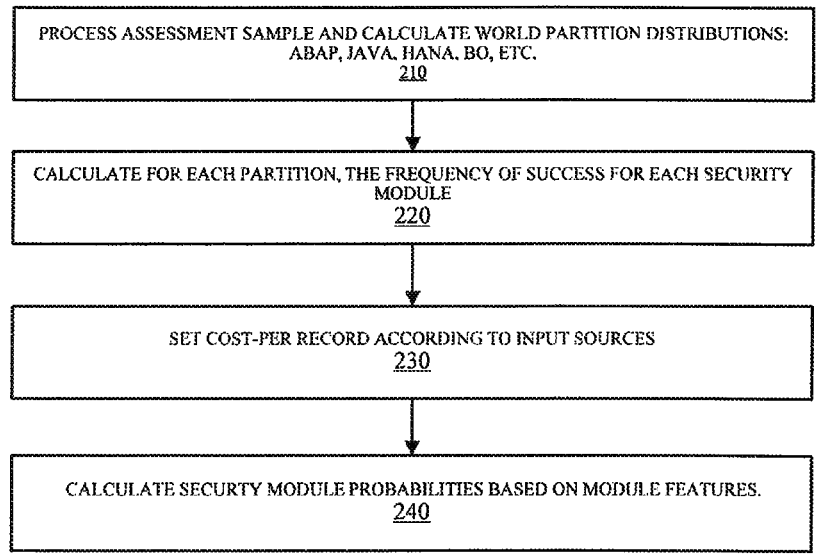
FIG. 2 is a flowchart outlining a method for parametrization to tune cyber risk calculator 101 parameters.

FIG. 2 is a flowchart that outlines the parametrization steps taken to tune the system 100. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. A security assessment sample includes the results of a list of security modules run against a given set of assets running business-critical applications, as shown in block 210. Each security module determines one of a security vulnerability, a misconfiguration or a missing patch. The security assessment sample is provided to the cyber-risk calculator 101 which adds the information to the sample of assessments against SAP and Oracle business-critical applications inside the parametrization database 102. The cyber-risk calculator 101 proceeds to the calculation of the world partition distributions. These partitions classify the samples into categories of assets, including, but not limited to: SAP HANA, SAP ABAP, SAP JAVA, SAP Business Objects, Oracle JD Edwards and Oracle E-Business Suite. If a new type of asset is incorporated, a new partition is added to the parametrization database 102. The breakdown of the world into partitions allows the system to determine which set of parameters from the parametrization database should be used later for risk calculation. This meaning that the risk calculator won't take into account those security modules that are unrelated to the partition to which the business critical application belongs to. For example: a security module checking a vulnerability present in SAP JAVA business applications won't be considered for risk calculation on an SAP ABAP business application.

For each partition, the frequency of success of each security module present in the parametrization database 102 is calculated, as shown in block 220. The cost per record inside the module is set, as shown in block 230. This is described further below, in reference to FIG. 3. For each security module inside the parametrization database 102, the probability of success is calculated based on the security module features, as shown by block 240.

Figure 3:
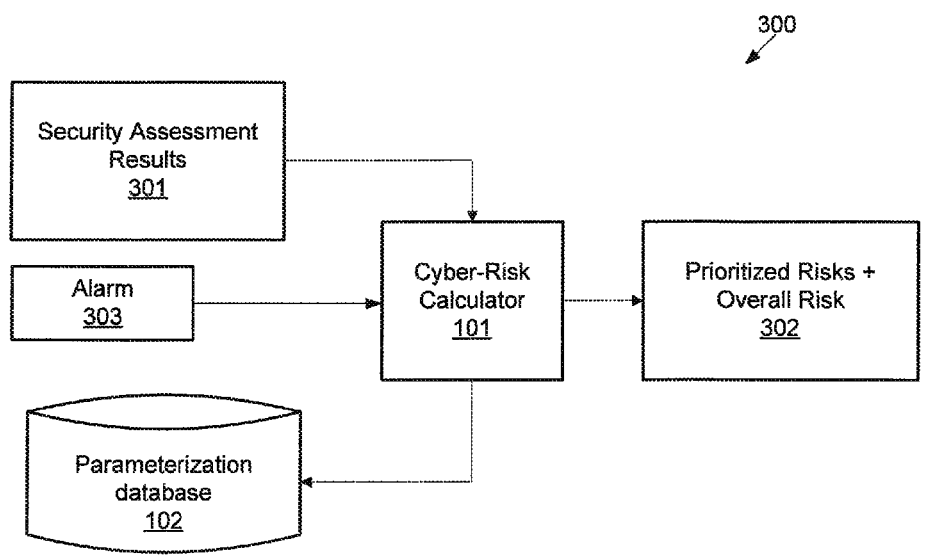
FIG. 3 is a schematic diagram depicting the process of risk calculation for a given security assessment sample.

FIG. 3 depicts the process of risk calculation for a given asset. The process 300 takes as input a sample with the results of a security assessment 301, containing all the security modules which have been run against a given asset with their correspondent results. The cyber-risk calculator 101 reads the model parameters from the parametrization DB 102 and proceeds with the risk calculation. The output 302 of the process is a set of prioritized security module risks with an overall risk level for the business critical application being assessed in the security assessment result sample. This output 302 may be a tuple of the form (<overall_asset_risk>, <security_module_risks>, <overall_asset_risk_with_net_effects>, <security_module_risks_with_net_effects>). <overall_asset_risk> is a number between 0 and 10 indicating the risk level for the business application in the security assessment result sample supplied as input. <security_module_risks> is a list containing all the security modules available in the parametrization database 102 and for each security module, a number indicating the level of risk imposed by that security module for the asset in the security assessment sample supplied as input. <overall_asset_risk_with_net_effects> is a number between 0 and 10 indicating the risk level for the business application in the security assessment sample supplied as input, but with the variation on the risk level due to the interconnections and trust relationships with other assets. Finally, <security_module_risks_with_net_effects> is a list containing all the modules available in the parametrization database 102 and for each module, a number indicating the level of risk imposed by that module for the business application in the security assessment sample supplied as input, with the variation on the risk levels due to the interconnections and trust relationships with other assets. This output is then either reported on a graphical interface and/or sent to connected third-party applications, subscribed via an API to the risk calculator output. The output then comprises an actionable event for a connected third-party, which could trigger mitigation and/or corrective actions such as but not limited to closing a firewall port, filtering a specific type of traffic from a specific source, blocking a user inside the business critical application, or any other action. One having ordinary skill in the art will appreciate that the abovementioned output is not limited to the examples of outputs described herein.

The cyber-risk calculator 101 also receives alarms 303 from a security monitoring system (not part of the present invention), which detects on-going attacks against business critical applications. These alarms are incorporated into the risk calculation and contain the information already described.

The present embodiments provide a "parametrization mode" which allows new security assessment samples to be incorporated into the parametrization database 102. Each time a new sample is added, the cyber-risk calculator 101 recalculates the security module probabilities based on the feature probabilities (as described below). This refines the precision of the probabilities used for calculating a risk level aligned with the real world samples supplied as input.

In order to properly tune the cyber-risk calculator 101, the system must be set-up with a set of security assessment samples which are used to build the statistical population used to calculate risk. The updates can be periodically triggered by running the cyber-risk calculator 101 in "parametrization mode".

The security assessment result samples used both for running in parametrization and in risk calculation modes contain the following information in a standardized format:
  Heading of the security assessment result sample:
  Date of the Vulnerability Assessment (YYYY-MM-DD hh:mm:ss)
  List of findings
  List of assessed system ids (SIDs)
  Body of the security assessment sample:
  List of security modules executed in the security assessment. For each security module:
    Description of the vulnerability or misconfiguration
    Unique ID (based on a unique ID into the parametrization database 102)

CVSS v2 score value and vector

List of vulnerable assets affected by this Finding (for instance the SAP System ID—SID)

For each security module in the sample not present in the parametrization database 102 it is added. For each security module added to the parametrization database 102, the present invention stores:

Description of the vulnerability/misconfiguration checked by the security module Whether it could be used to take complete control of a system or not (taken from the security assessment module or via a manual configuration)

Whether it is used by auditor and/or attackers in the real world to compromise systems (it's due to theoretical vulnerabilities that are almost impossible to implement in the field). This is determined by the auditor performing the security assessment CVSS v2 Vector (AV/AC/Au/C/I/A)

CVSS v2 Numerical value

World partition to which it belongs (HANA, BO, DIAG, JDE, etc.)

Unique ID

List of security frameworks in which the module to exploit this security module is implemented List of dates of the implementation of the security module on each security framework Date of publication of the security module advisory (if any)

This information is periodically updated as new security modules appear in the security assessment frameworks.

The cyber-risk calculator 101 also allows tuning the cost per-record to be considered during the risk calculation. This value can be changed also while running in "parametrization mode".

Finally, the cyber-risk calculator 101 automatically configures the number of records taken into account while calculating the risk exposure. This reflects how many records are considered as sensitive in the business critical application being monitored. This number depends on the amount of records present in specific database tables inside the business critical application and the components installed in it.

Some examples of these tables are illustrated in Table 1. These examples are for SAP components installed in an SAP business-critical applications:

TABLE 1

| | |
|---|---|
| SAP ERP | VCNUM, VCKUN |
| SAP HR | PA0001, PA0002 |
| SAP SRM | HTT1222 |
| SAP CRM | BUT000, BUT0BK, BUT0CC, PCA_MASTER |
| SAP SOLMAN | SMSY_SYS_CLIENTS, SMSY_CLIENTS, SMSY_VSUBSYS |

When working in "risk calculation mode" the cyber-risk calculator 101 receives as input the results of a security assessment performed against a monitored asset running a business critical application. For example, the result may have been originated by an automated security assessment framework execution or by a manual security assessment. The security assessment contains the same information as the information described for those supplied as input for the "parametrization mode".

Once the cyber-risk calculator 101 processes the input, it proceeds with the calculation of the risk exposure for each module inside the input. This is used to indicate how likely is for an asset running a business critical application to be compromised by an attacker using each of the modules in the input and also calculates an overall risk exposure for the asset. The risk informed is expressed in terms of expected loss, based on:

i. The modules which were reported to be successful in the security assessment input, i.e., security flaws present in the asset and their respective cyber risk exposure level.

ii. The cost per-record configured in the cyber-risk calculator 101.

iii. The amount of records taken into account for the asset.

Once the risk exposure values have been calculated as described by the statistical model described below, they are returned to the user sorted by those values, giving the user a prioritized list of modules according to their expected loss, and an overall level of cyber-risk.

The statistical model supporting the method described in the present embodiments is described here. This model is bound to the universe of business-critical applications. This is an important remark, since the public vulnerabilities found in these applications is a concrete, known number.

The world of SAP and Oracle systems over the period of time of a month is denoted by U. From this world, there are a total of c compromised assets. The basic formula to calculate the probability of compromise for a given asset is:

$$p(c)=c/U \qquad \text{(Eq. 1)}$$

To better express this probability, a "vulnerability vector" found in the asset is taken into account. This assumes there are k vulnerabilities in the asset denoted $X\_1, X\_2, \ldots, X\_k$, and the probability of an asset being compromised conditioned to having those vulnerabilities is to be calculated. This probability may be written as:

$$p(c|X\_1, X\_2, \ldots, X\_k) \qquad \text{(Eq. 2)}$$

When the asset has only one vulnerability $X\_i$, it can be calculated as:

$$p(c|X\_i)=p(c;X\_i)/p(X\_i)=(U/U\_X\_i)(C\_X\_i/U)=C\_X\_i/U\_X\_i \qquad \text{(Eq. 3)}$$

Where:

$C\_X\_i$ is the total of assets in U compromised by vulnerability $X\_i$.

$U\_X\_i$ is the total of assets in U where vulnerability $X\_i$ is present.

$p(c; X\_i)$ is the joint probability of being compromised and having the vulnerability $X\_i$.

For the case of multiple vulnerabilities, statistical independence is assumed. While this assumption is not entirely accurate, it is useful for a first approximation, and will subsequently be corrected.

It is useful to determine the probability of the asset being compromised for any of the vulnerabilities. This could be stated as follows: an asset is compromised either with vulnerability $X\_1$, or $X\_2, \ldots$, or $X\_k$. This may be written in a complimentary form: Determine the probability of the asset not being compromised, and for that to happen, it must be compromised by neither X_1, nor X_2, . . . , nor X_k. This may be expressed as:

$$p(\neg c | X\_1, X\_2, \ldots, X\_k) = p(\neg c | X\_1) p(\neg c | X\_2) \ldots p(\neg c | X\_k) \quad \text{(Eq. 4)}$$
$$= [1 - p(c|X\_1)] [1 - p(c|X\_2)] \ldots [1 - p(c|X\_k)]$$

The probability of an asset being compromised, given a set of vulnerabilities is:

$$p(c|X\_1, X\_2, \ldots, X\_k) = 1 - p(\neg c | X\_1, X\_2, \ldots, X\_k) \quad \text{(Eq. 5)}$$
$$= 1 - [1 - p(c|X\_1)][1 - p(c|X\_2)] \ldots [1 - p(c|X\_k)]$$

The previous description about p(c) assumes knowledge of the probability of an attack for each vulnerability. This assumption may be relaxed by breaking each vulnerability into a set of basic features and the use those features to calculate this probability. Those features are:

There exists an exploit for the vulnerability.
The vulnerability can be exploited remotely.
A publicly available penetration testing tool[1] has an exploit for the vulnerability.
The vulnerability has some CVSS value.
The vulnerability can be exploited without any authentication. The amount of days, months or years since the vulnerability was disclosed.

Each of these features is designated gamma_i. The probability of an asset being compromised, conditioned to the presence of a vulnerability may be rewritten as:

$$p(c|X\_i) \approx 1 - [1 - p(c|\text{gamma\_1})][1 - p(c|\text{gamma\_2})] \ldots [1 - p(c|\text{gamma\_r})] \quad \text{(Eq. 6)}$$

In this case, it is of special importance the assumption of independence between the features. Returning to a set of vulnerabilities, this may be rewritten as:

$$p(c|X\_1, X\_2, \ldots, X\_k) = 1 - [1 - p(c|X\_1)][1 - p(c|X\_2)] \ldots [1 - p(c|X\_k)] \approx 1 - [[1 - p(c|\text{gamma\_11})][1 - p(c|\text{gamma\_12})] \ldots [1 p(c|\text{gamma\_1r})]][[1 - p(c|\text{gamma\_21})][1 - p(c|\text{gamma\_22})] \ldots [1 - p(c|\text{gamma\_2r})]]) \ldots [[1 - p(c|\text{gamma\_k1})][1 - p(c|\text{gamma\_k2})] \ldots [1 - p(c|\text{gamma\_kr})]] \approx 1 - [1 - p(c|\text{gamma\_1})]^{n\_1} [1 - p(c|\text{gamma\_2})]^{n\_2} \ldots [1 - p(c|\text{gamma\_r})]^{n\_r} \quad \text{(Eq. 7)}$$

Where n_j denotes the number of vulnerabilities among X_1, . . . , X_k which have the feature gamma_j. This relates calculated result (left side), and an estimated value (right side). In particular, the terms of the form p(c|gamma_i) will allows using the stats collected from security assessments. This expression allows generalization of the math to obtain an estimation of the probability by only knowing some features of the vulnerability.

$$p(c|\text{gamma\_i}) = p(\text{gamma\_i};c)/p(\text{gamma\_i}) = p(\text{gamma\_i}|c)p(c)/p(\text{gamma\_i}) \quad \text{(Eq. 8)}$$

The term p(gamma_i|c) is a generic form of the Sensitivity concept described in the literature (see [AM13], page 4 where is considered gamma_i=v.score>=6 and taking v belonging to SYM as a proxy to c). When asking what the probability is that a given vulnerability has higher CVSS if there's an attack, we are really asking about this probability using "high CVSS" as a feature gamma_i. What remains to be calculated is:

$$p(c)/p(\text{gamma\_i}) = (c/U)(U/\text{gamma\_i}) = c/\text{gamma\_i} \quad \text{(Eq. 9)}$$

The term p(gamma_i|c)/p(gamma_i) represents a score of the relevance at the time of fixing a vulnerability. If p(c|gamma_i) is broken into a term that depends on a global variable and the features of the vulnerabilities, it is inside the term p(gamma_i|c)/p(gamma_i) providing all the information relative to the vulnerabilities that affect the probability of having a compromised asset.

The term p(gamma_i) in p(gamma_i|c)/p(gamma_i) is the term that indicates how strange or common a given feature is. With very low probability the term p(gamma_i|c)/p(gamma_i) works as an augmenter of the p(c) term. If the feature is present in almost all the vulnerabilities, it does not provide any extra information. This probability may be calculated by considering the following identity:

$$p(\text{gamma\_i}) = p(\text{gamma\_i} | c) p(c) = p(\text{gamma\_i} | \neg c) p(\neg c) \quad \text{(Eq. 10)}$$
$$= (C\_\text{gamma\_i}/U) + (comp(C\_\text{gamma\_i})/U) = \text{gamma\_i}/U$$

Being comp(C_gamma_i) the complement of the set C_gamma_i.

Using the results of the security assessments, this number may be found by storing all the vulnerabilities that have been found for an asset, and from there calculating p(gamma_i|c) and p(gamma_i|¬c).

In the previous description of the model behind the present invention, the assumption of independence between the features that characterize a vulnerability is heavily used. Under this assumption one may write:

$$p(\text{gamma\_i}, \text{gamma\_j}) = p(\text{gamma\_i}) p(\text{gamma\_j})$$

However, this is not a valid assumption. Table 1 shows the correlation of the presence of each of the vulnerability features present in the CVSS version 2 (CVSS v2) vector for those vulnerabilities in the initial dataset, described previously.

TABLE 2

|      | AV:N   | AC:H   | AC:L   | Au:N   | C:C    | C:N    | I:N    | I:P    | A:C    | A:N    |
|------|--------|--------|--------|--------|--------|--------|--------|--------|--------|--------|
| AV:N | 1.000  | −0.020 | 0.143  | 0.075  | 0.048  | 0.043  | 0.093  | −0.121 | 0.045  | 0.128  |
| AC:H | −0.020 | 1.000  | −0.826 | 0.238  | −0.006 | −0.100 | −0.298 | 0.290  | 0.011  | −0.375 |
| AC:L | 0.143  | −0.826 | 1.000  | −0.297 | −0.043 | 0.054  | 0.288  | −0.247 | −0.066 | 0.367  |
| Au:N | 0.075  | 0.238  | −0.297 | 1.000  | −0.073 | −0.250 | 0.014  | 0.036  | −0.109 | −0.018 |
| C:C  | 0.048  | −0.006 | −0.043 | −0.073 | 1.000  | −0.130 | −0.285 | −0.393 | 0.947  | −0.390 |
| C:N  | 0.043  | −0.100 | 0.054  | −0.250 | −0.130 | 1.000  | −0.149 | 0.229  | −0.123 | 0.030  |
| I:N  | 0.093  | −0.298 | 0.288  | 0.014  | −0.285 | −0.149 | 1.000  | −0.770 | −0.270 | 0.617  |
| I:P  | −0.121 | 0.290  | −0.247 | 0.036  | −0.393 | 0.229  | −0.770 | 1.000  | −0.372 | −0.332 |
| A:C  | 0.045  | 0.011  | −0.066 | −0.109 | 0.947  | −0.123 | −0.270 | −0.372 | 1.000  | −0.370 |
| A:N  | 0.128  | −0.375 | 0.367  | −0.018 | −0.390 | 0.030  | 0.617  | −0.332 | −0.370 | 1.000  |

Given the matrix in Table 2, with values over 0.9, p(gamma_i, gamma_j) is not equal to p(gamma_i) p(gamma_j). The feature factors are calculated as p(gamma_i|c)/p(gamma_i). By taking the features as a set the independence assumption may be solved. This results are those illustrated with in the factors of Table 3. Table 3 shows the factors calculated after grouping the vulnerability features as sets.

TABLE 3

| Feature | factor |
|---------|--------|
| (AV:N/AC:H/Au:N/C:C/I:C/A:C) | 10.674 |
| (AV:N/AC:H/Au:N/C:P/I:P/A:P) | 0.128  |
| (AV:N/AC:L/Au:N/C:C/I:C/A:C) | 5.461  |
| (AV:N/AC:L/Au:N/C:C/I:C/A:P) | 10.674 |
| (AV:N/AC:L/Au:N/C:P/I:N/A:P) | 10.674 |
| (AV:N/AC:L/Au:N/C:P/I:P/A:N) | 0.316  |
| (AV:N/AC:L/Au:N/C:P/I:P/A:P) | 5.604  |
| (AV:N/AC:L/Au:S/C:C/I:C/A:C) | 1.704  |
| (AV:N/AC:L/Au:S/C:P/I:P/A:P) | 1.212  |
| (AV:N/AC:M/Au:N/C:C/I:C/A:C) | 10.674 |
| (AV:N/AC:M/Au:N/C:P/I:P/A:P) | 1.090  |

In order to check whether the factors p(c|gamma_i) are realistic and reflect those derived from the initial sample, a consistency check through weighted Monte Carlo simulations is performed:

Simulate a world of SAP/Oracle assets running business critical applications.

The distribution of the amount of vulnerabilities will be the same as the one observed in the security assessments in the initial sample.

Randomly compromise a proportion p(c)=0.01 of assets. In order to choose which assets are going to be compromised, take into account a probability that is proportional to the amount of exploitable vulnerabilities on each asset. If the universe has 100000, choose 1000 and mark them as compromised. The probability to mark an asset as compromised is proportional to the amount of exploitable vulnerabilities it has.

For each type gamma_i of vulnerabilities, compute the amount of assets that have $n\_i>0$. This value is $e\_i$.

For each type gamma_i, compute the amount of compromised assets that have been compromised by this vulnerability, $c\_i$.

Compute $p(c|gamma\_i, n\_i=E(n\_i))=c\_i/e\_i$

Compute $p(c|gamma\_i, n\_i=1)$ using the relationship:

$$p(c|gamma\_i, n\_i=1)=1-(1-p(c|gamma\_i, n\_i=E(n\_i)))^{(1/E(n\_i))}$$

Then, obtain the probabilities in Table 3. If the simulation is run to measure consistency, the empirical p_hat(c)=0.01003, is a value that is approximately equal to the value of p(c).

Table 3 shows the probabilities for each vulnerability feature after running a simulation for checking consistency of the underlying statistical model.

TABLE 4

| Vulnerability Feature | Probability |
|-----------------------|-------------|
| AV:N/AC:H/Au:N/C:C/I:C/A:C | 0.003480 |
| AV:N/AC:H/Au:N/C:P/I:P/A:P | 0.002562 |
| AV:N/AC:L/Au:N/C:C/I:C/A:C | 0.002510 |
| AV:N/AC:L/Au:N/C:C/I:C/A:P | 0.002650 |
| AV:N/AC:L/Au:N/C:P/I:N/A:P | 0.002642 |
| AV:N/AC:L/Au:N/C:P/I:P/A:N | 0.002229 |
| AV:N/AC:L/Au:N/C:P/I:P/A:P | 0.002649 |
| AV:N/AC:L/Au:S/C:C/I:C/A:C | 0.002562 |
| AV:N/AC:L/Au:S/C:P/I:P/A:P | 0.002637 |
| AV:N/AC:M/Au:N/C:C/I:C/A:C | 0.002566 |
| AV:N/AC:M/Au:N/C:P/I:P/A:P | 0.002437 |

Figure 4:
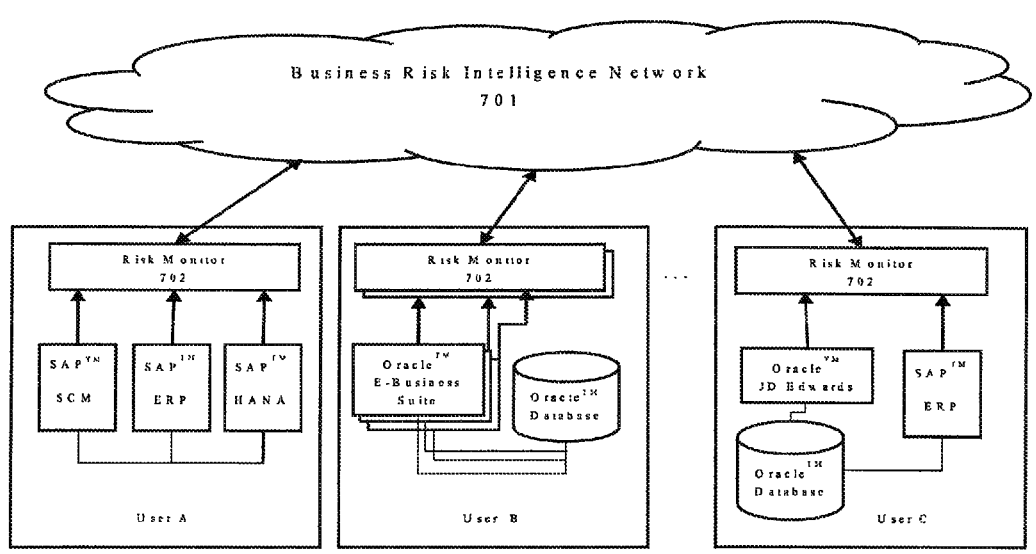
FIG. 4 is a schematic diagram showing how the results obtained from different Risk Monitors 702 deployed in separate user environments (different companies or business units) and monitoring heterogeneous business-critical applications is sent anonymized to a central Business Intelligence Network 701 running in a cloud infrastructure, which uses that information to later provide intelligence based on the risk posture reported by different users.

Table 4 shows how the results obtained from different Risk Monitors 702 (FIG. 4) deployed in separate user environments (different companies or business units) and monitoring heterogeneous business-critical applications. The security assessment result samples are being anonymized by removing any data that could identify an asset inside the sample. Once anonymized, it is sent to a central Business Intelligence Network 701 (FIG. 4) running in a cloud infrastructure, which uses that information to later provide intelligence based on the risk posture reported by different users. The cloud central Business Intelligence Network 701 (FIG. 4) runs a version of the present statistical model which builds the statistical sample out of security assessment result samples from multiple users and companies.

The cyber-risk calculator 101 may be connected to an existent security monitoring system which provides information about vulnerabilities being exploited or security misconfigurations being actively abused by an attacker. When the system detects there is an on-going attack with a particular exploit/module over an asset. The cyber-risk calculator 101 proceeds by incorporating this information into the risk calculation. If it is not a vulnerability already contemplated while building the model, the cyber-risk calculator 101 incorporates it by running the function for the new feature vector, which is the previous vector plus the CVSS VECTOR of the newly detected vulnerability.

If the probability of compromise is p=p(c|gamma_1, . . . , gamma_n), the cyber-risk calculator 101 may update the probability as follows:

$$v=1-p \quad \text{(Eq. 11)}$$

$$p\_new=1-v*[1-p(c|gamma\_new)] \quad \text{(Eq. 12)}$$

where gamma_new refers to the CVSS VECTOR of the new vulnerability/module, and p(c| . . . ) is defined the same way as described previously.

The variation: delta_p=(p_new−p)/p is also reported by the Cyber-risk calculator 101 together with the incremental exposure to risk, this is:

$$\text{Incremental Exposure to Risk:} = \text{Risk Exposure with new vulnerability} - \text{Original Risk Exposure} \quad \text{(Eq. 13)}$$

Over time, vulnerabilities tend to represent varying behavior in their effectiveness compromising an asset. These may be described as:
a. Discovery of the Vulnerability
b. First Exploit appearance
c. Climax Being able to identify these stages allows adjustment of the risk an asset is exposed to while the vulnerability is present. When between stages (b) and (c) it is known that as time goes by, the risk represented by that vulnerability will increment. This way, if the vulnerability represents a big part of the overall risk, it is desirable to repair the vulnerability as soon as possible.

This information is provided by the time span in the initial sample. The same modules present varying effectiveness in security assessments once the first exploit has been included in public frameworks.

The availability of modules and exploits in public security frameworks is central to the model. Some of these frameworks include Onapsis Bizploit, Metasploit and ERPScan. The availability of modules and exploits in public frameworks was analyzed by [AM13] to prove that ranking patches according to the CVSS value only is not enough to fully back a patching policy.

To do so, $p(c|gamma\_i, zeta\_i)$ is defined where $zeta\_i$ represents the presence of the exploit in an exploit toolkit or in the black market.

Assets running business critical applications are not isolated and the interconnections may produce correlated risk as shown in the model presented in [BS10]. Using the computed $p(c|GAMMA\_j)$ for each asset j (being GAMMA_j the set of vulnerability features of all the vulnerabilities present in asset j) and the topology of the network computed using the different trust relationships established between the assets, such as the RFC destinations between SAP instances. While attacking business-critical applications the real network topology is not as important as the trust relationships that could allow pivoting. Using this we add the probabilities of pivoting between assets. With those ingredients, the simulation is enhanced defining different entry points and scenarios, where the total loss for a single entry, which may include several assets compromised, is computed.

This simulation creates a new risk premium pi_hat for each asset. This risk premium includes the network effect, which is the difference with the originally computed risk premium. This setup increases the precision of the prediction while allowing creation of better network permission policies.

Using the data provided by Mark Greisiger's "Cyber Liability & Data Breach Insurance Claims—A Study of Actual Claim Payouts (2013), the following Impact Model may be built:

$$CT = CR*R \quad \text{(Eq. 13)}$$

Where:
CT=Total Cost
CR=Cost per Record
R=Records
With this, the expected value of CT is calculated as follows:

$$E(CT) = \text{integral}(CT*Rf(CT,R)d(CT,R)) \quad \text{(Eq. 14)}$$

The data provided is consistent with modeling these variables with a Log Normal distribution. These kinds of random variables have the property that their logarithm corresponds to a Normal Distribution, as follows:

$$\ln CT = \ln CR + \ln R \quad \text{(Eq. 15)}$$

$$E(\ln CT) = E(\ln CR) + E(\ln R) \quad \text{(Eq. 16)}$$

$$\text{Var}(\ln CT) = \text{Var}(\ln CR) + \text{Var}(\ln R) + 2\text{sigma\_}(\ln CR)\text{sigma\_}(\ln R)\text{rho\_}(\ln CR, \ln R) \quad \text{(Eq. 17)}$$

Using collected data, for example, the numbers in Mark Greisiger's "Cyber Liability & Data Breach Insurance Claims—A Study of Actual Claim Payouts (2013), the following values may be estimated:
ln CT~Norm(12.4, 1.66^2)
ln CR~Norm(4.67, 2.88^2)
ln R~Norm(7.82, 3.7^2)
Furthermore, rho(ln CE, ln R)=−0.90, implying a negative relationship between the amount of affected records and the cost of an individual record.

Assuming an asset has r=10.000.000 and it loses them completely, in order to know how much it really lost, the cost per record must be determined. Since the cost per record follows a Log Normal distribution, its logarithm therefore follows a Normal distribution. Due to the correlation with the distribution of compromised records, a new distribution for the cost, conditioned to loss may be calculated as:

$$\ln CR | R=r \sim \text{Norm}(mu\_\ln CR + \text{sigma\_}CR/\text{sigma\_}\ln R \, \text{rho}(\ln R - mu\_\ln R), (1-\text{rho}^2)\text{sigma}^2\_\ln CR) \quad \text{(Eq. 18)}$$

By using exponentiation, the distribution of Cost per Record (see above) is determined. Multiplying by r yields the Total Cost of Loss. The model considers a total loss, which means that all records are compromised by a breach. Table 5 shows the distribution of Total Loss Cost for different amount of records.

TABLE 5

| Records Lost | Min | Median | Mean | Max |
|---|---|---|---|---|
| 7500 | 32,867.8 | 371,253.41 | 797,846.1 | 4,193,434.39 |
| 2,514,500 | 185,013.13 | 2,089,786.74 | 4,491,078.55 | 23,604,856.74 |
| 100,000,000 | 278,843.90 | 3,149,637.39 | 6,768,761.94 | 35,576,232.72 |

The model described above indicates how vulnerabilities affect assets and estimates a risk derived from the features of those vulnerabilities. While this is a sound model for prioritizing patches, when considered as an insurance-inspired model, it still gives the premium the same number of sensitive records to be insured and the same cost per record to all assets. The cost per record is modeled with a Log Normal distribution but still have the number of records fixed for the whole model.

Since the present system and method was developed and implemented for SAP and Oracle scenarios we can do a better job regarding the number of records considered for each asset. Consider a Business Process as a given set of functions (which in the SAP jargon would be grouped as transactions, programs or reports and for Oracle would be programs). Some of these Business Processes are common to every SAP/Oracle implementation.

Considering the database tables each of the functions on these common Business Processes modify, sensitive tables may be defined that allow refinement of the model according to the Business Processes running on a single asset and the real number of records the model takes into account while calculating the expected loss. This was previously described an exemplified while previously describing the automatic record counting.

Figure 5:
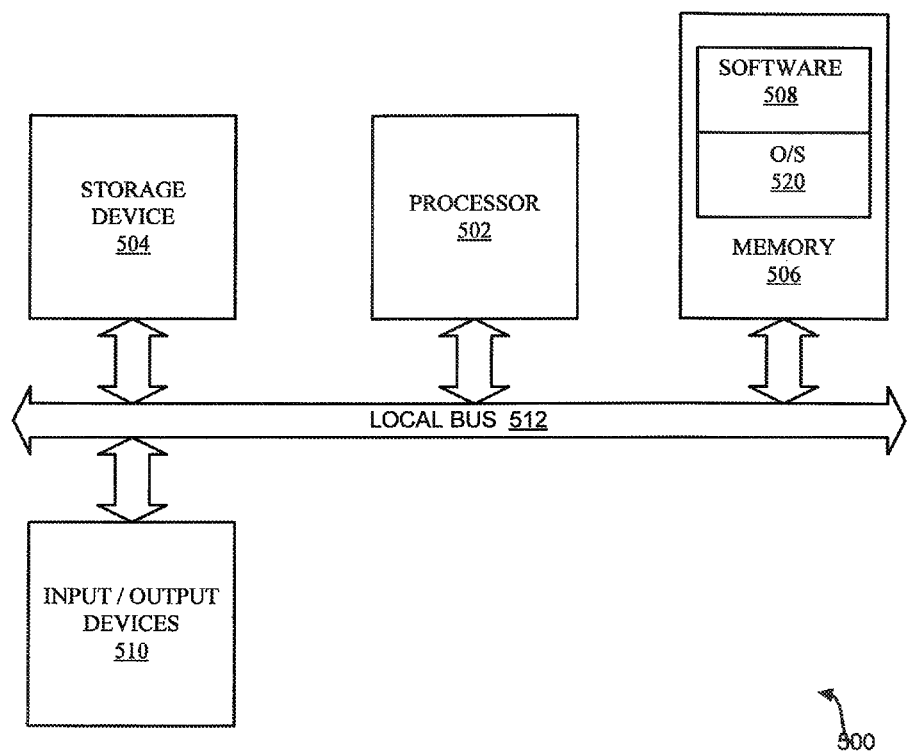
FIG. 5 is a schematic diagram illustrating an example of a system for executing functionality of the present invention.

The present system for executing the functionality described in detail above may be (or include) a computer, an example of which is shown in the schematic diagram of FIG. 5. The system 500 contains a processor 502, a storage device 504, a memory 506 having software 508 stored therein that defines the above mentioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macro-processor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for calculating cyber-risk in a software application, comprising:
   a cyber-risk calculator comprising a processor configured to execute non-transitory instructions stored in a memory, which when executed perform the steps of:
      receiving from a penetration testing tool a security assessment result sample comprising a list of security modules, each security module listing including a respective result of a security assessment of the application identifying a vulnerability and/or misconfiguration capable of being exploited and/or abused; and
      running the cyber-risk calculator in a risk calculation mode further comprising the steps of:
         referencing a set of parameters from a parametrization database according to a world partition corresponding to the application;
         determining a cyber-risk exposure level for the application based upon the security assessment result sample and the set of parameters;
         sorting a plurality of risk exposure levels according to an expected loss and a probability of the application being compromised:
         adjusting the risk exposure levels to account for interconnections and trust relationships between business critical applications, wherein determining the cyber-risk exposure level further comprises the probability of the application being compromised and the expected loss when the application has been compromised: and
         reporting results of the cyber-risk calculation,
   wherein the software application comprises a business critical application.

2. The system of claim 1, wherein reporting the cyber-risk calculation further comprises the steps of:
   a first numeric value indicating an overall cyber-risk exposure level of the application;
   a list of the names of the security modules in the security assessment result sample, each security module name associated with a second numeric value indicating its associated cyber-risk exposure level;
   a third numeric value indicating the overall cyber-risk exposure level of the application considering the interconnections and trust relationships with other applications; and
   an expected loss calculated based on the parameters and the numeric values indicating the overall risk.

3. The system of claim 1, wherein running the cyber-risk calculator in a risk calculation mode further comprises the step of determining the world partition of the application that the security assessment result sample belongs to.

4. The system of claim 2, wherein the set of parameters further comprise one or more of the group consisting of a cost per-record in a business-critical application, the number of records taken into account for cyber risk calculation and, for each security module present in the security assessment result sample, a probability of success based on the security module features and the world partition to which the application belongs.

5. The system of claim 1, wherein the world partition is divided into one or more of the group consisting of SAP ABAP, SAP JAVA, SAP HANA, SAP Business Objects, Oracle JD Edwards, and Oracle E Business Suite.

6. The system of claim 4, further comprising the step of automatically configuring a number of records taken into account while calculating the risk exposure level.

7. The system of claim 6 wherein automatically configuring the number of records taken into account while calculating the risk exposure level comprises the steps of:
   determining the database tables in the application that must be queried according to the world partition the software application belongs to and the components installed in the application; and
   counting the number of records in the determined database tables.

8. The system of claim 1, wherein determining a cyber-risk exposure level further comprises the probability of the application being compromised and the expected loss when the application has been compromised.

9. The system of claim 8, further comprising the step of sorting a plurality of risk exposure levels according to the expected loss and the probability of the application being compromised.

10. The system of claim 9, further comprising the step of adjusting the risk exposure levels to account for statistical inter-dependency of multiple vulnerabilities.

11. The system of claim 1, wherein the processor is part of a cloud based server.

12. The system of claim 11, wherein any information in the security assessment result sample that may distinguish a first application from a second application is removed.

13. The system of claim 1, further comprising the step of:
   running the cyber-risk calculator in a parameterization mode further comprising the steps of:
      calculating a set of parameters based upon the security assessment result sample and the values already stored in the parametrization database; and
      populating the parametrization database with the new parameters.

14. The system of claim 1, wherein the set of parameters in the parameterization database is set to a default set of values.

15. The system of claim 1, wherein the parameterization database comprises dynamic coefficients representing security module features selected from the group consisting of a Common Vulnerability Scoring System (CVSS) vector, a CVSS value, a coefficient representing whether the vulnerability could be used to take control of the application, and a coefficient representing whether the vulnerability may be used by auditors and/or attackers in to compromise the application.

16. The system of claim 15, wherein the parameterization database further comprises one or more of a list of security frameworks in which the security module is implemented, a list of dates of the implementation of the security module on each security framework, and a date when the security module was published.

17. The system of claim 1, wherein the parameterization database includes a cost per record comprising an adjustable initial parameter.

18. The system of claim 17, wherein determining the cyber-risk exposure level further comprises the step of tuning the cost per record.

19. The system of claim 1, wherein running the cyber-risk calculator further comprises the step of receiving information from a security monitoring suite comprising an alarm triggered when the security monitoring suite detects a security module being actively exploited/abused in the application monitored by the security monitoring suite.

20. The system of claim 19, wherein the alarm comprises an identification of the security module being actively exploited/abused.

21. The system of claim 20, wherein the alarm further comprises data specific to a security module.

\* \* \* \* \*